United States Patent [19]

Koppes et al.

[11] Patent Number: 5,441,720
[45] Date of Patent: Aug. 15, 1995

[54] PENTAFLUOROSULFANYLNITRAMIDE SALTS

[75] Inventors: William M. Koppes; Michael E. Sitzmann, both of Adelphi, Md.

[73] Assignee: The United States of America as represented by the Secretary of the Navy, Washington, D.C.

[21] Appl. No.: 93,422

[22] Filed: Jul. 13, 1993

[51] Int. Cl.$^6$ ............................................. C01B 17/45
[52] U.S. Cl. .................................... 423/386; 149/45; 423/467
[58] Field of Search .................. 423/386, 467; 149/45

[56] References Cited

U.S. PATENT DOCUMENTS

| | | |
|---|---|---|
| 3,980,509 | 9/1976 | Lubowitz et al. .................. 423/351 |
| 4,849,540 | 7/1989 | Sitzmann et al. .................. 149/88 |
| 5,194,103 | 3/1993 | Sitzmann ............................. 149/88 |
| 5,198,204 | 3/1993 | Bottaro et al. ..................... 423/385 |
| 5,254,324 | 10/1993 | Bottaro et al. ...................... 149/45 |
| 5,292,387 | 3/1994 | Highsmith et al. .................. 149/45 |

*Primary Examiner*—Edward A. Miller
*Attorney, Agent, or Firm*—Roger D. Johnson

[57] ABSTRACT

A pentafluorosulfanylnitramide salt that is ammonium pentafluorosulfanylnitramide, sodium pentafluorosulfanylnitramide, potassium pentafluorosulfanylnitramide, lithium pentafluorosulfanylnitramide, or cesium pentafluorosulfanylnitramide. These salts are useful as energetic oxidizers in explosives and propellants.

6 Claims, No Drawings

PENTAFLUOROSULFANYLNITRAMIDE SALTS

BACKGROUND OF THE INVENTION

This invention relates to energetic compounds and more particularly to energetic inorganic nitrocompounds.

Ammonium dinitramide (ADN) is a prior art high oxidant balance oxidizer. M. J. Kamlet and H. G. Adolph disclose in *Propellants and Explosives*, 4, 30 (1979) a method of measuring the oxidant balance of energetic compounds. They defined oxidant balance ($OB_{100}$) to be the number of equivalents of oxidant per hundred grams of explosive above the amount required to burn all hydrogen to $H_2O$ or HF and all carbon to CO. For C—H—N—O—F explosives, the applicable equation is, $$OB_{100} = 100(2n_o + n_F - n_H - 2n_c - 2n_{coo})$$

where $n_o$, $n_F$, $n_H$ and $n_c$ represent the number of atoms of the respective elements in the molecule, and $n_{coo}$ is the number of carboxy groups. The $OB_{100}$ for ADN is 3.22 and is significantly higher than that of ammonium nitrate ($NH_4NO_3$) ($OB_{100} = 2.50$). However, ADN suffers a disadvantage because of its relatively low density (1.80 g/cc). Density will have a large effect on the performance of an energetic material since the calculated detonation pressure will vary with the square of the density. (See M. J. Kamlet and S. J. Jacobs, J. Chem. Phys. 48, 23 (1968).) Thus, it would be advantageous to have available a high oxidant balance oxidizer(s) that has $OB_{100}$ greater than that of ADN but also has a significantly higher density.

SUMMARY OF THE INVENTION

Accordingly, an object of this invention is to provide new energetic oxidizers for explosives and propellants.

Another object of this invention is to provide new energetic oxidizers which have high oxidant balances and high densities.

These and other objects of this invention are accomplished by providing:

a pentafluorosulfanylnitramide salt that is ammonium pentafluorosulfanylnitramide, sodium pentafluorosulfanylnitramide, potassium pentafluorosulfanylnitramide, lithium pentafluorosulfanylnitramide, or cesium pentafluorosulfanylnitramide.

DETAILED DESCRIPTION OF THE PREFERRED EMBODIMENT

The energetic compounds of this invention are the pentafluorosulfanylnitramide salts:

(1) ammonium pentafluorosulfanylnitramide, $NH_4^+[SF_5N(NO_2)]^-$;

(2) sodium pentafluorosulfanylnitramide, $Na^+[SF_5N(NO_2)]^-$;

(3) potassium pentafluorosulfanylnitramide, $K^+[SF_5N(NO_2)]^-$;

(4) lithium pentafluorosulfanylnitramide, $Li^+[SF_5N(NO_2)]^-$;

and (5) cesium pentafluorosulfanylnitramide, $Cs^+[SF_5N(NO_2)]^-$.

These salts are useful as oxidizers for propellants and explosives. These salts are particularly useful as high energy, high density oxidizers for metallized propellants and underwater explosives.

The oxidant balance ($OB_{100}$) of ammonium pentafluorosulfanylnitramide is 3.41 and compares favorably to that of ammonium dinitramide at 3.22. For the calculation, sulfur was considered equivalent to oxygen since it has been shown that sulfur behaved as an oxidant (similar to oxygen) in the detonation of an $SF_5$ explosive to give COS and $H_2S$ as the only sulfur containing species. (See D. L. Ornellas, *Propell.,Explos., Pyrotech.*, 14, 122 (1989); M. E. Sitzmann, W. H. Gilligan, D. L. Ornellas and J. S. Thrasher, *J. Energetic Mater.*, 8 (4), 352 (1990).).

The x-ray crystal density of ammonium pentafluorosulfanylnitramide could not be obtained due to the inability to grow suitable crystals. Crystals of ammonium pentafluorosulfanylnitramide were always fine needles even though a large variety of crystallization solvents were employed. The x-ray crystal density of potassium pentafluorosulfanylnitramide is 2.584 g/cc, which is 17% higher than the density (2.201 g/cc) of potassium dinitramide, $K^+[N(NO_2)_2]^-$. A similar increase in density for ammonium pentafluorosulfanylnitramide compared to ammonium dinitramide (density = 1.801 g/cc), would result in a predicted density of 2.11 g/cc for ammonium pentafluorosulfanylnitramide.

Ammonium pentafluorosulfanylnitramide (1), a high oxidant balance, high density oxidizer, is prepared by treating N-pentafluorosulfanyl-N-nitro carbamates with ammonia at low temperature.

$$SF_5N(NO_2)CO_2R + NH_3 \xrightarrow[-40°\ C.]{CH_2Cl_2}$$

$$NH_4^+[SF_5N(NO_2)]^- + H_2NCO_2R$$
$$\underline{1}$$

Example 1 provides specific reaction conditions for preparing ammonium pentafluorosulfanylnitramide from N-pentafluorosulfanyl-N-nitro-1-octyl carbamate ($R = -(CH_2)_7CH_3$) and ammonia. Preparation of the N-pentafluorosulfanyl-N-nitro-1-octyl carbamate from pentafluorosulfanyl isocyanate and 1-octanol is given by quoted prior art example 3. The preparation of pentafluorosulfanyl isocyanate from readily available common chemicals is given by quoted prior art example 4.

The sodium, potassium, lithium, and cesium pentafluorosulfanylnitramide salts can be prepared from ammonium pentafluorosulfanylnitramide via ion exchange chromatography.

$$NH_4^+[SF_5N(NO_2)]^- \xrightarrow[\text{Ion Exchange Resin}]{ZOH} Z^+[SF_5N(NO_2)]^-$$

(where $Z^+$ is $Na^+$, $K^+$, $Li^+$, or $Cs^+$). Example 2 illustrates the preparation of potassium pentafluorosulfanylnitramide from ammonium pentafluorosulfanylnitramide using KOH and a Dowex ion exchange resin (50X-2-100). By using NaOH, LiOH, or CsOH and the resin, the corresponding pentafluorosulfanylnitramide salts can be prepared.

The general nature of the invention have been set forth, the following examples are presented as specific illustrations thereof. It will be understood that the invention is not limited to each specific example, but is susceptible to various modifications that will be recognized by one of ordinary skill in the art.

EXAMPLE 1

Ammonium Pentafluorosulfanylnitramide (1)

A solution containing 1.5g (4.36 mmol) of N-pentafluorosulfanyl-N-nitro-1-octyl carbamate in 20 ml of dichloromethane was stirred well at $-35°$ to $40°$ C. during the slow addition of ammonia gas (above surface) until the mixture remained basic to damp pH paper. The mixture was allowed to warm to $0°$ C. and then was placed in a water bath at $16°-18°$ C. while most of the volatiles were removed under reduced pressure. Filtration (after cooling to $0°$ C.) gave 0.5g of solid which was stirred with 10 ml of dichloromethane to yield 0.4g of insoluble ammonium pentafluorosulfanylnitramide, mp $89°-92°$ C. dec. The volatiles were removed from the filtrate and the residue (1.15g) was stirred with 10 ml of dichloromethane to give an additional 0.2 g of insoluble solid, mp $89°-92°$ C. dec. The total (0.6 g) is 68% of the theoretical yield. $^{19}F$ NMR (DMSO, $CFCl_3$ as internal standard): 96.3 ($SF_{ax}$, 1F), 67.4 ($SF_{EQ}$, 4F). IR (KBr): 1410, 1350 ($NO_2$); 900-750 ($SF_5$).

EXAMPLE 21

Potassium Pentafluorosulfanylnitramide (2)

A Dowex Ion Exchange resin (50X-2-100, 20 g) was treated with dilute KOH solution and rinsed with water to pH 4.5. A column of this resin was used for chromatography of ammonium pentafluorosulfanylnitramide (87 mg) (water as eluant). The eluate gave, after evaporation, 75 mg of colorless solid which was confirmed as the potassium salt by X-ray crystallography (Density 2.584, crystals from methanol): mp $134°-135°$ C. (dec.).

Example 3 is quoted from *Journal of Fluorine Chemistry*, 52 (1991) 195-207, titled, "N-PENTAFLUOROSULFANYL-N-NITRO CARBAMATES," by Michael E. Sitzmann. Example 3 provides a method of preparing the N-pentafluorosulfanyl-N-nitro-1-octyl carbamate starting material used in example 1.

EXAMPLE 3

N-Pentafluorosulfanyl-1-octyl carbamate (prior art)

Pentafluorosulfanyl isocyanate (2.4 g, 1.42 mmol) was condensed into dry dichloromethane (9 mL) at $-78°$ C. A solution of 1-octanol (1.8 g, 1.42 mmol) in dichloromethane (10 ml) was added dropwise before a dry ice condenser was attached and the mixture was allowed to warm to room temperature. After 2 hours, the volatiles were removed to give 4.1 g (97%) of N-Pentafluorosulfanyl-1-octyl carbamate, mp $66°-68°$ C. Crystallization from dichloromethane did not raise the melting point; IR (KBr) 3210 (NH), 1740 (C=O), 875 ($SF_5$); $^1H$ NMR ($CDCl_3$) 0.9-1.7 (m), 4.27 (t), 7.87 (bs). Anal. Calcd for $C_9H_{18}F_5NSO_2$: C, 36.11; H, 6.06; F, 31.74; N, 4.68; S, 10.71. Found: 35.83; H, 5.98; F, 31.85; N, 4.71; S, 10.84.

Example 4 is quoted from an article by Joseph S. Thrasher, Jon L. Howell, and Alan F. Clifford entitled "Acylations of Pentafluorosulfanylamine, $SF_5NH_2$," Inorganic Chemistry, 1982, Vol. 21, No. 4, pages 1616+ at 1620. It provides a method by which the starting material pentafluorosulfanyl isocyanate ($SF_5NCO$) used in example 3 can be prepared.

EXAMPLE 4

Pentafluorosulfanyl isocyanate (prior art)

"Preparation of $SF_5NHC(O)F$. In a typical reaction, 150 mmol each of $NSF_3$, $COF_2$, and HF were condensed into a 75-mL stainless-steel cylinder at $-196°$ C. After the mixture was allowed to react for 5 days at room temperature, the volatile components were transferred onto a NaF scrubber while the reaction cylinder was held at $-50°$ C. The product could then be removed from the cylinder as a colorless liquid. The $SF_5NHC(O)F$ has a vapor pressure of $\sim 50$ torr at $25°$ C. and spontaneously loses HF when in contact with glass or NaF. The yield ($\sim 50\%$) was determined by removing the product to a NaF scrubber for several hours and then measuring the quantity of $SF_5NCO$ recovered."

Obviously, numerous other modifications and variations of the present invention are possible in light of the foregoing teachings. It is therefore to be understood that within the scope of the appended claims the invention may be practiced otherwise than as specifically described.

What is claimed and desired to be secured by Letters Patent of the United States is:.

1. A pentafluorosulfanylnitramide salt of the formula $$Z^+[SF_5N(NO_2)]^-$$

wherein $Z^+$ is $NH_4^+$, $Na^+$, $K^+$, $Li^+$, or $Cs^+$.

2. The salt of claim 1 that is ammonium pentafluorosulfanylnitramide,

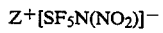
$NH_4^+[SF_5N(NO_2)]^-$.

3. The salt of claim 1 that is sodium pentafluorosulfanylnitramide,

$Na^+[SF_5N(NO_2)]^-$.

4. The salt of claim 1 that is potassium pentafluorosulfanylnitramide,

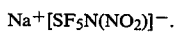
$K^+[SF_5N(NO_2)]^-$.

5. The salt of claim 1 that is lithium pentafluorosulfanylnitramide,

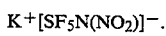
$Li^+[SF_5N(NO_2)]^-$.

6. The salt of claim 1 that is cesium pentafluorosulfanylnitramide,

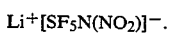
$Cs^+[SF_5N(NO_2)]^-$.

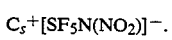
* * * * *